(12) United States Patent
Meng et al.

(10) Patent No.: US 12,351,741 B2
(45) Date of Patent: Jul. 8, 2025

(54) ADHESIVE FOR BONDING DISSIMILAR MATERIALS IN MEDICAL DEVICE

(71) Applicant: CareFusion 303, Inc., San Diego, CA (US)

(72) Inventors: Fanqing Meng, Buffalo Grove, IL (US); Zehra Sevinc, Long Grove, IL (US); Marc William Weimer, South Jordan, UT (US); James Joseph Semler, Randolph, NJ (US)

(73) Assignee: CareFusion 303, Inc., San Diego, CA (US)

( * ) Notice: Subject to any disclaimer, the term of this patent is extended or adjusted under 35 U.S.C. 154(b) by 75 days.

(21) Appl. No.: 17/748,791

(22) Filed: May 19, 2022

(65) Prior Publication Data

US 2022/0389294 A1 Dec. 8, 2022

Related U.S. Application Data

(60) Provisional application No. 63/191,871, filed on May 21, 2021.

(51) Int. Cl.
*C09J 175/14* (2006.01)
*C09J 5/10* (2006.01)
*C09J 11/06* (2006.01)

(52) U.S. Cl.
CPC .............. *C09J 175/14* (2013.01); *C09J 5/10* (2013.01); *C09J 11/06* (2013.01)

(58) Field of Classification Search
CPC ............. C09J 175/14; C09J 5/10; C09J 11/06
See application file for complete search history.

(56) References Cited

U.S. PATENT DOCUMENTS 4,813,210 A * 3/1989 Masuda ................... A61L 2/26
53/472
6,657,011 B2 12/2003 Lau et al.
(Continued)

FOREIGN PATENT DOCUMENTS

JP 2008133326 A * 6/2008
JP 2012-144641 A 8/2012

OTHER PUBLICATIONS

International Preliminary Report on Patentability from the International Preliminary Examining Authority for Application No. PCT/US2022/028381, dated Aug. 9, 2023, 19 pages.
(Continued)

*Primary Examiner* — Daniel McNally

(57) ABSTRACT

Bonding dissimilar materials of medical device components can be carried out by applying an adhesive on at least one surface of two components which are composed of dissimilar materials and contacting the surfaces and exposing the contacted surfaces to heat and/or irradiate the adhesive to cure the adhesive and bond the surfaces. One medical component, e.g., medical tubing, can be composed of a non-polar, polyvinyl chloride free thermoplastic polymeric material and the other medical component, e.g., a medical connector, can be composed of polyacrylate, polyacrylonitrile, acrylonitrile-butadiene-styrene (ABS), methyl methacrylate-acrylonitrile-butadiene-styrene (mABS), polyester, and/or a polycarbonate material. The adhesive formulation can include: (a) a polyolefin oligomer having reactive acrylate groups and alkenyl groups, (b) an initiator, and optionally (c) a solvent.

11 Claims, 3 Drawing Sheets

(56) References Cited

U.S. PATENT DOCUMENTS

| | | |
|---|---|---|
| 7,122,592 B2 | 10/2006 | Wentworth et al. |
| 2009/0050266 A1 | 2/2009 | Yang |
| 2012/0205043 A1 | 8/2012 | Kurimura et al. |
| 2015/0240009 A1 | 8/2015 | Hashimoto |
| 2016/0229942 A1 | 8/2016 | Hashimoto |
| 2020/0086620 A1* | 3/2020 | Sevinc ............... C09J 5/00 |

OTHER PUBLICATIONS

TCI Chemicals, "Polymerization Initiators", Tokyo Chemical Industry Co., Ltd., F2037E 20221110, date unknown, retrieved from https://www.tcichemicals.com/pdf/F2037E.pdf.
International Search Report and Written Opinion for Application No. PCT/US2022/028381, dated Aug. 17, 2022, 15 pages.
Anonymous, "Nisso-PB | Nippon Soda Co., Ltd.", Sep. 23, 2018, XP93038311, Retrieved from the Internet: URL:http://web.archive.org/web/20180923082724/http://www.nippon-sode.co.jp/pb/list.html [retrieved on Apr. 11, 2023].
Written Opinion of the International Preliminary Examining Authority for Application No. PCT/US2022/028381, dated May 10, 2023, 12 pages.

* cited by examiner

ADHESIVE FOR BONDING DISSIMILAR MATERIALS IN MEDICAL DEVICE

CROSS-REFERENCE TO RELATED APPLICATION

This application claims priority to U.S. Provisional Application No. 63/191,871 filed 21 May 2021, the entire disclosure of which is hereby incorporated by reference herein.

TECHNICAL FIELD

The present disclosure generally relates to bonding dissimilar materials of medical device components by an adhesive including (a) a polyolefin oligomer having reactive acrylate groups and pendant 1,2 vinyl groups along the polyolefin oligomer chain, (b) an initiator, and optionally (c) a solvent.

BACKGROUND

The assembly of tubing, valves, fittings, and spikes that connect a fluid container with or without an infusion pump to a patient may be referred to as an "IV set." Infusion sets are constructed by joining multiple polymeric tubing segments to multiple polymeric components. The joints are typically formed by applying a thin layer of solvent or adhesive on one or both of the contacting surfaces and then the two surfaces are brought together.

However, infusion sets are increasingly being constructed with non-polyvinylchloride materials such as thermoplastic elastomers and polyolefins, which are difficult to bond to other medical components, particularly components made of different polymeric materials, due to their relative chemical inertness. Hence, a more significant issue in manufacturing infusion sets using tubing made from thermoplastic elastomers is to consistently join such tubing and infusion components to obtain a secure and/or leak free joint with desired fluid flow.

Accordingly, there is a continuing need to improve adhesion, improve cohesion failure-resistance and provide leakage-proof joints between medical tubing and rigid connectors, and/or between needles to connector hubs particularly with polyvinyl-chloride-free materials for medical devices.

SUMMARY

Aspects of the subject technology relate to an adhesive formulation that includes (a) a polyolefin oligomer having reactive acrylate groups and reactive alkenyl groups, (b) an initiator such as a thermal or photo-initiator, and optionally, (c) a solvent. The adhesive is adapted to bond dissimilar materials of medical device components. Advantageously, the reactive polyolefin oligomer includes a non-polar primary polymer backbone, reactive alkenyl groups, such as alkenes or pendant 1,2 vinyl groups along the polyolefin oligomer chain and polar end segments that include polar linking groups such as carbamates (urethan groups), esters linking reactive (meth)acrylate end groups. In addition, the reactive polyolefin oligomer can include any functionality that can react to form covalent linkages in response to external stimulus such as heat, light, or ionizing radiation in addition to the acrylates and vinyl groups. The polyolefin oligomer having reactive acrylate groups can have a number average molecular weight of from about 500 to about 30,000 g/mol such as from about 500 to about 10,000 or 5,000, or 3,000 g/mol.

Additional aspects of the subject technology relate to bonding dissimilar materials of medical device components by applying the adhesive on a surface of one medical component comprised of a non-polar, non-polyvinyl chloride thermoplastic polymeric material or on a surface of another medical component comprised of a polyacrylate, polyacrylonitrile, polyester, and/or a polycarbonate or on both such surfaces; contacting and exposing the contacted surfaces to heat or light radiation to crosslink the adhesive and to bond the surfaces; and subjecting the bonded surfaces to sterilization. The sterilization advantageously can further induce chemical reactions of the adhesive and can include sterilization, such as by ionizing radiation.

Other aspects of the subject technology relate to an infusion set comprising a tubing comprised of a non-polar, polyvinyl chloride free thermoplastic polymeric material bound to a medical connector by a cured adhesive formulation; wherein the adhesive formulation comprises (a) a polyolefin oligomer having reactive acrylate groups and alkenyl groups, (b) an initiator, and optionally (c) a solvent.

Embodiments include one or more of the following features individually or combined. For example, one medical component to be bonded can be medical tubing and the other medical component can be a medical connector; the tubing can comprise a styrene-containing thermoplastic elastomer, for example and the connector can be composed of an acrylic-based polymer, polyacrylonitrile, acrylonitrile-butadiene-styrene (ABS), methyl methacrylate-acrylonitrile-butadiene-styrene (mABS), acrylic-polycarbonate based material, polyesters, polycarbonate or a combination thereof.

Additional advantages of the subject technology will become readily apparent to those skilled in this art from the following detailed description, wherein only certain aspects of the subject technology are shown and described, simply by way of illustration. As will be realized, the subject technology is capable of other and different configurations, and its several details are capable of modifications in various other respects, all without departing from the subject technology. Accordingly, the drawings and description are to be regarded as illustrative in nature, and not as restrictive.

BRIEF DESCRIPTION OF THE DRAWINGS

The accompanying drawing, which is included to provide further understanding and is incorporated in and constitute a part of this specification, illustrate disclosed embodiments and together with the description serve to explain the principles of the disclosed embodiments. In the drawings.

DETAILED DESCRIPTION

Figure 1:
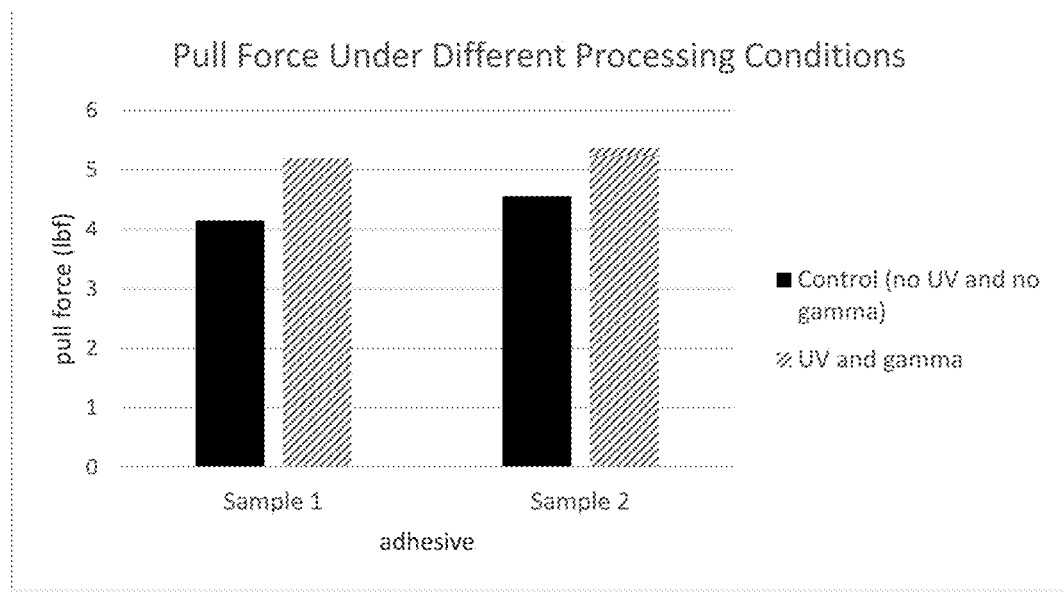
FIG. 1 is a plot of pull force differences of sample adhesive formulations subjected to no radiation and UV/gamma radiation. The UV/gamma radiation processed group is statistically significant (p=0.000).

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

Aspects of the subject technology relate to an adhesive formulation (or adhesive for short) that includes (a) a polyolefin oligomer having reactive acrylate groups and alkenyl groups, (b) an initiator such as a thermal or photo-initiator, and, optionally, (c) a solvent. Advantageously, the reactive polyolefin oligomer includes a non-polar primary polymer backbone, reactive alkenyl groups, such as alkenes or pendant 1,2 vinyl groups along the polyolefin oligomer chain, and polar end segments that include polar linking groups such as carbamates (urethan groups), esters linking reactive (meth)acrylate end groups. In addition, the reactive polyolefin oligomer can include any functionality that can react to form covalent linkages in response to external stimulus such as heat, light, or ionizing radiation in addition to the acrylates and vinyl groups. The adhesive can further include acrylate monomeric components to copolymerize with the polyolefin oligomer, viscosity modifiers, tackifiers and/or inhibitors, e.g., free radical inhibitors, to prolong the shelf-life of the thermal or photocurable adhesive formulation.

Advantageously, the polyolefin oligomer having reactive acrylate groups is the principle component (at least 50% by weight) of the reactive components of the adhesive. In some embodiments, the adhesive formulation includes at least 60%, 70%, 80% or higher (by weight) of the reactive polyolefin oligomer as the reactive components of the adhesive. The adhesive can be cured by two separate modes due to the two different types of reactive groups of the polyolefin oligomer. That is, the acrylate groups can be cured by a photocure and the 1,2 vinyl groups can be cured by ionizing radiation (e.g., e-beam and/or gamma radiation) under conditions that are useful for sterilizing medical devices. The 1,2 vinyl groups, which tend to react through ionizing radiation can also react with components and constituents in the adhesive and mating surfaces, which adds to the strength of the bond.

The adhesive formulation of the present disclosure is adapted to bond dissimilar materials of medical device components such as medical device components made from generally non-polar, polyvinyl chloride free thermoplastic polymeric materials to medical device components made from generally polar acrylic-based polymeric materials, polyacrylonitrile, acrylonitrile-butadiene-styrene (ABS), methyl methacrylate-acrylonitrile-butadiene-styrene (mABS), acrylic-polycarbonate based materials, polyester, polycarbonate, etc. Medical device components made from a non-polyvinyl chloride thermoplastic polymeric material include medical tubing and medical device components made from polyacrylates, polyacrylonitriles, polyesters, polycarbonates, etc. include rigid connectors such as spike, male luer, needleless valve connectors and rigid couplers. The adhesive formulation of the present disclosure is further adapted to withstand sterilization by heat, chemical or radiation (e.g., sterilized with heat, ethylene oxide or gamma radiation) which is a common practice with medical devices such that after bonding the surfaces with the adhesive the medical device is subjected to such sterilization.

The adhesive formulation of the present disclosure can advantageously be used to bond dissimilar materials of medical device components by applying the adhesive on a surface of one medical component comprised of a non-polar, non-polyvinyl chloride thermoplastic polymeric material or on a surface of another medical component comprised of a polyacrylate, polyacrylonitrile, polyester, and/or a polycarbonate or on both such surfaces; contacting the surfaces having the applied adhesive; and exposing the contacted surfaces to heat or radiation to crosslink the adhesive and to bond the surfaces. The radiation can include (i) light radiation such as UV radiation and (ii) ionizing radiation such as e-beam and/or gamma radiation.

In certain aspects, the one medical component can be comprised of a non-polar, non-polyvinyl chloride thermoplastic polymeric material can be medical tubing comprised of a non-polyvinyl chloride thermoplastic polymeric material. In other aspects, another medical component can be comprised of a polyacrylate, polyacrylonitrile, polyester, and/or a polycarbonate can be a rigid connector or coupler comprised of a polyacrylate, polyacrylonitrile, polyester, and/or a polycarbonate.

Exemplary adhesion formulation of the present disclosure includes, without limitation, a polyolefin oligomer having reactive acrylate groups (i.e., at least two reactive acrylate groups) and reactive pendant 1,2 vinyl groups along the polyolefin oligomer chain. Such polyolefin oligomers can be a polybutadiene oligomer having reactive acrylate groups, an acrylic modified chlorinated polyolefin with or without maleic anhydride functionality. Such reactive polyolefin oligomers can have polar groups linking the reactive acrylate to the olefin such as a polybutadiene acrylate resin with (meth)acrylic groups attached to either end of the polybutadiene chain via urethane linking groups. Additional reactive groups can also be included in the polyolefin oligomer such as epoxy groups and maleic anhydride residues. The polyolefin oligomer having reactive acrylate groups can have a number average molecular weight of from about 500 to about 30,000 g/mol such as from about 500 to about 10,000 or 5,000, or 3,000 g/mol.

Use of a polyolefin oligomer having reactive acrylate groups in an adhesive formulation of the present disclosure has the advantage that the repeating units of the reactive polyolefin are similar to the non-polar, thermoplastic polymeric materials of one of the medical components subjected to bonding and thus creates an affinity to the thermoplastic. Further the acrylate and other polar groups on the reactive polyolefin oligomer can create an affinity to the other medical device component made from polar materials. For example, urethane or carbamate is a strong polar group to promote the surface interaction with the polar surface of rigid plastics through dipole-dipole moment or hydrogen bonding.

In addition, use of an oligomer, as opposed to monomeric components, results in a smaller volume shrinkage upon polymerization that will minimize the filling volume change in the gap of bonding interface area. Thus, it is expected that potential leakage of bonded components can be ameliorated. Another advantage of certain polyolefin oligomer having reactive acrylate groups in an adhesive formulation of the present disclosure is that post sterilization from Gamma or e-beam radiation is capable of continuing the reaction of residual reactive groups, such as 1,2 vinyl groups, to further cure the adhesive. For example, a (meth)acrylate functional end-group and 1,2 vinyl side chain have crosslinking reaction to generate a heavily crosslinked network to form a high tensile force thermoset.

In one aspect of the present disclosure, polyolefin oligomer having reactive acrylate groups in an adhesive formulation of the present disclosure comprises a polybutadiene oligomer having reactive acrylate groups as represented by Formula (I) below.

Formula (I)

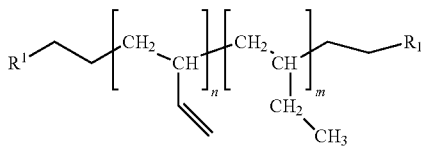

In which $R_1$ represents an acrylate or methacrylate moiety, n is an integer from 10 to about 500 such as from 10 to about 100, m is an integer from 0 to about 250 such as from 0 to about 100. In an aspect of the present disclosure, the polybutadiene oligomer having reactive acrylate groups can have a number average molecular weight of from about 500 to about 30,000 g/mol such as from about 500 to about 10,000 or 5,000, or 3,000 g/mol. An acrylate or methacrylate moiety can be represented as shown below:

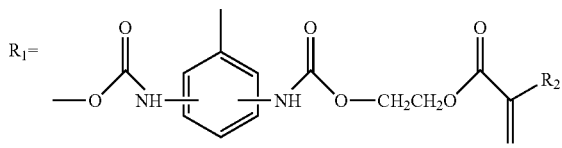

In which $R_2$ represents H or methyl.

Other polyolefin oligomer having reactive acrylate groups in an adhesive formulation of the present disclosure can include those shown in Scheme 1 below.

Scheme 1

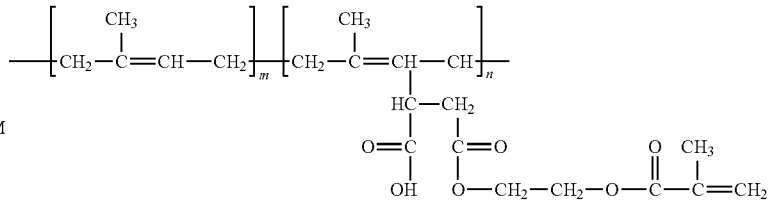

Such polyolefin oligomer having reactive acrylate groups linked to the polyolefin oligomer chain via polar esters linkages also include reactive alkenyl groups along the polyolefin oligomer chain.

The adhesion formulation of the present disclosure can also include, without limitation, acrylate monomeric component such as isobornyl acrylate (IBOA), methyl acrylate, ethyl acrylate, butyl acrylate, Isobutyl acrylate, tert-butyl acrylate, hexyl acrylate, 2-ethylhexyl acrylate, octyl acrylate, decyl acrylate, Isodecyl acrylate, Isooctyl acrylate, Lauryl acrylate, Octadecyl acrylate, Tridecyl acrylate, 2-Naphthyl acrylate, Benzyl acrylate etc.

The adhesive formulation can also include one or more initiators to initiate crosslinking of the reactive groups of the polyolefin oligomer having reactive acrylate groups and/or other monomeric components. Useful initiators that can be included in the adhesive formulation of the present disclosure include, for example, thermal polymerization initiators and photopolymerization initiators.

Thermal polymerization initiators are compounds that generate radicals or cations upon exposure to heat. For example, azo compounds such as 2,2'-azobis(isobutyronitrile) (AIBN), 2,2'-azodi(2-methylbutyronitrile) (AMBN), 2,2'-azobis(2,4-dimethylvaleronitrile) (ADVN) and organic peroxides such as benzoyl peroxide (BPO), tert-butyl hydroperoxide (TBHP) thermal radical initiators, and benzenesulfonic acid esters and alkylsulfonium salts, etc. can be used in the adhesive of the present disclosure as thermal initiators.

The adhesive formulation can also include a photopolymerization initiators which generate free radicals upon light irradiation, such as ultraviolet light irradiation, can also or alternatively be used in the adhesive of the present disclosure including, for example and without limitation, ketones, benzophenone, 2-hydroxy-2-methyl-1-phenyl-1-propanone available as Darocur 1173, a phosphine oxide such as a diphenylphosphine oxide initiator, e.g., diphenyl(2,4,6-trimethylbenzoyl)phosphine oxide available as Irgacure® TPO, bis(2,4,6-trimethylbenzoyl)-phenylphosphineoxide (Irgacure 819), etc.

Solvents that can be used in the adhesive formulation of the present disclosure include, without limitation, one or more of an alcohol, such as methanol, ethanol, isopropanol, propanol, butanol, pentanol, benzyl alcohol, a glycol such as diethylene glycol, propylene glycol, an ether, such as dioxolane, tetrahydrofuran, 1,3-dioxane, a ketone, such as acetone, methyl ethyl ketone, cyclohexanone, an ester such as ethyl acetate, ethyl formate, an amide such as dimethyl formamide, dimethyl and diethyl acetamide, N-methyl pyrrolidone, a sulfoxide, such as dimethyl sulfoxide, a hydrocarbon such as hexanes, toluene, a chlorinated solvents such as methylene chloride, etc.

Adhesive formulation of the present disclosure are useful for bonding dissimilar medical device components such as components of an infusion set including medical tubing for administration of medical fluid by infusion and connectors.

In accordance with certain aspects, tubing for administration of intravenous can comprise non-polyvinyl chloride (PVC) thermoplastic polymeric and/or silicone materials. Such materials include, for example, one or more of, or a blend including, a silicone, a thermoplastic olefin (TPO), a thermoplastic elastomer (TPE) such as a styrene-containing thermoplastic elastomer (S-TPE), such as a styrenic blocking copolymer (SBC), e.g., styrene-butadiene styrene copolymer (SBS), styrene-butadiene-styrene-styrene block copolymer (SBSS), styrene-isoprene-styrene (SIS), a polyolefin elastomer (POE). To improve thermo-oxidative and UV stability, an unsaturated rubber block of a S-TPE elastomer (e.g., the polybutadiene or polyisoprene rubber block of an SBS, SBSS or SIS polymer) can be hydrogenated to form hydrogenated styrene-based thermoplastic elastomers, which include, without limitation, styrene-ethylene-butylene-styrene thermoplastic elastomer (SEBS), styrene-ethylene/propylene-styrene (SEPS). High performance thermoplastic elastomer (TPE) has been designed as a sustainable alternative to flexible PVC for medical tubing and film. In addition, the tubing can include a blend of the hydrogenated styrene-based thermoplastic elastomer with a hydrogenated or saturated polyolefin such as polypropylene, e.g., homo, block and/or random polypropylene such as random copolymer polypropylene (RCPP), etc.

Such exemplary materials can be optically transparent, heat stable, chemical and radiation sterilizable (e.g., sterilized with heat, ethylene oxide or ionizing radiation) and physiologically inert. Such exemplary materials are also environmentally compatible and can be incinerated with minimal contaminates.

Tubing of the present discloser can have an inner diameter for flow of fluid therethrough ranging from about 0.1 mm to about 3.5 mm, e.g., from about 0.5 mm to about 2.5 mm and an overall sidewall thickness ranging from 0.1 mm to 2 mm, such as from about 0.4 mm to about 1 mm.

Tubing of the present disclosure is particularly useful with intravenous assemblies, gravity containers and/or infusion pumps for the transport of intravenous fluid to a patient. An assembly of tubing, valves, fittings, and spike that connect a fluid container to a patient intravenously may be referred to as an "IV set". Infusion pumps are medical devices that may be used to administer intravenous (IV) fluids. Such assemblies, containers and pumps employ tubing bound to one or more medical connectors and tubing of the present disclosure is useful as such.

For example, tubing according to the present disclosure can be readily mated and bonded to a medical connector or other medical component by applying a thin layer of an adhesive of the present disclosure on one or both of the contacting surfaces. After the adhesive is applied, the tubing surface and surface of the other medical component are contacted and exposed to heat and/or radiation to crosslink the adhesive and to bond the surfaces. The contacting surface of the tubing can either be at the inner diameter, the outer diameter, or both inner and outer diameters depending on whether the contacting surface to be bonded is an inner layer, outer layer or both. The adhesive can be applied either internally, externally, or both.

Medical connectors that can benefit from the present disclosure include, without limitation, connectors comprised of acrylic-based polymeric materials, polyacrylonitrile, acrylonitrile-butadiene-styrene (ABS), methyl methacrylate-acrylonitrile-butadiene-styrene (mABS), acrylic-polycarbonate based materials, polyesters, polycarbonates, etc., or combinations thereof.

In an embodiment of the present application, tubing according to the present disclosure can be readily mated and bond to a medical connector by applying an adhesive on a surface of the tubing or on a surface of a medical component, e.g., a medical connector, or on both the surface of the tubing and the surface of the medical component. The surfaces having the applied adhesive are contacted and the contacted surfaces are exposed to heat or radiation to crosslink the adhesive and to bond the surfaces. The bonded medical components can then be subjected to sterilization by heat, chemical or radiation. In certain embodiments, when the adhesive includes a polyolefin oligomer with pendant vinyl groups, sterilization with gamma radiation further cures the adhesive forming a stronger bond to the mated surfaces.

EXAMPLES

The following examples are intended to further illustrate certain aspects of the subject technology and are not limiting in nature. Those skilled in the art will recognize, or be able to ascertain, using no more than routine experimentation, numerous equivalents to the specific substances and procedures described herein.

A series of adhesive formulations were prepared by combining one of two grades of a polybutadiene acrylate resin with (meth)acrylic groups attached to either end of the polybutadiene chain via urethane linking groups. Such resins are commercially available from Nippon Soda Co. as TE-2000 and TEAI-1000. The chemical structures and properties for these resins are provided in Scheme 2 and Table 1 below.

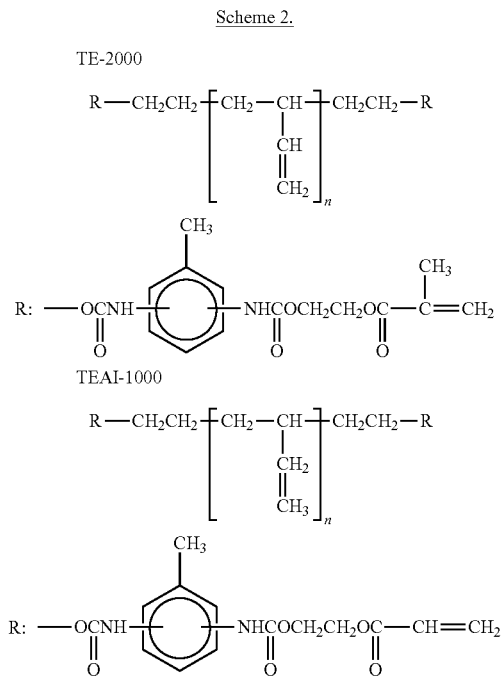

Scheme 2.

TABLE 1

Basic properties of polybutadiene acrylate resin with (meth)acrylic groups

| Grade | Terminal | Mn | 1,2 Vinyl (%) | Viscosity (Poise/ 45° C.) | Tg (° C.) | Acryl equivalent (g/eq) |
|---|---|---|---|---|---|---|
| TE-2000 | Urethane Methacylate | 2500 | 88 | 1500 | −9 | 1750 |
| TEAI-1000 | Urethane acrylate | 2000 | <7 | 3000 | −31 | 1350 |

The following six samples were prepared as described.

Samples 1: An experiment study was conducted to develop a formulation with TE2000 dissolved in methyl ether ketone (MEK) to make a homogenous viscosity solution at 50% w/w concentration.

Samples 2: An experiment study was conducted to develop a formulation with TEAI-1000 dissolved in methyl ether ketone to make a homogenous viscosity solution at 50% w/w concentration.

Sample 3: To 7 g of 50% TE-2000 from Sample 1 (3.5 g of TE-2000) was added photoinitiator Irgacure 819 of 0.1 g to make a weight ratio of 70:2 of TE-2000 and Irgacure 819.

Sample 4: To 7 g of 50% TEAI-1000 from sample 2 (3.5 g of TEAI-1000) is added photoinitiator Irgacure 819 of 0.1 g to make a weight ratio of 70:2.

Sample 5: To 7 g of 50% TE-2000 (3.5 g of TE-2000) from Sample 1 was added Isobornyl acrylate (IBOA) of 1.5 g, Irgacure 819 of 0.1 g to make a solution with a weight ratio of 70:30:2 of TE-2000, Isobornyl acrylate (IBOA) and Irgacure 819.

Sample 6: To 7 g of 50% TEAI-1000 (3.5 g of TEAI-1000) from Sample 2 was added IBOA of 1.5 g, Irgacure 819 of 0.1 g to make a solution with a weight ratio of 70:30:2 of TEAI-1000, IBOA and Irgacure 819.

Bonding Assembly and Processing of Styrenic TPE Tubing to Female Pocket Luer Connector:

An extruded styrenic blocking copolymer based TPE tubing with a dimension of ID 0.107" and OD 0.145" was cut into 3" lengths each, then followed with a thin layer of adhesive coating applied by cotton Q-tip on the tubing outer surface about 0.5" length coverage. The adhesives were from the prepared Samples 1-6, above. The adhesive covered tubing segment was manually inserted into the female pocket of the luer connect (mABS material) all the way until it stopped and firmly engaged. The assembly then proceeded to UV curing with a LED 365 nm wavelength for 20 s. The UV output was 1 to 1.5 W/cm$^2$ with the curing distance of 1" between the LED head and the assembly junction. The assembly was also sterilized with gamma radiation to study effectiveness from gamma radiation with a dosage of 21.4 to 35 kGy range.

Bonded Assembly Separation Force Measurement by Instron:

Using universal testing (Instron), a pull force testing was performed at 20 in/min strain rate. The luer connector was placed in a holding fixture and then adjusted the upper gripper so that it will clamp onto the tubing 1" away from the opening of the bond pocket.

Pull force results (samples size 5) by sample groups at different processing conditions (UV, gamma) are shown in the Table 2 below, along with failure mode (TPO=tube pull out, TB=Tubing break).

TABLE 2

| Sample Group | Mean (lbf) | Max (lbf) | Min (lbf) | Std Dev (lbf) | Failure |
|---|---|---|---|---|---|
| Group 1: Non-UV, Non-Gamma, | | | | | |
| Sample 1 | 4.15 | 4.24 | 4.01 | 0.09 | 5 TPO |
| Sample 2 | 4.56 | 4.74 | 4.48 | 0.11 | 5 TPO |
| Sample 3 | 4.19 | 4.35 | 4.01 | 0.15 | 5 TPO |
| Sample 4 | 4.12 | 4.27 | 3.98 | 0.11 | 5 TPO |
| Sample 5 | 4.35 | 4.43 | 4.27 | 0.07 | 5 TPO |
| Sample 6 | 4.28 | 4.43 | 4.09 | 0.14 | 5 TPO |

TABLE 2-continued

| Sample Group | Mean (lbf) | Max (lbf) | Min (lbf) | Std Dev (lbf) | Failure |
|---|---|---|---|---|---|
| Group 2: Gamma, but Non-UV | | | | | |
| Sample 3 | 5.42 | 5.83 | 4.88 | 0.37 | 5 TPO |
| Sample 4 | 5.18 | 5.51 | 4.8 | 0.29 | 5 TPO |
| Sample 5 | 5.3 | 5.61 | 4.59 | 0.42 | 5 TPO |
| Sample 6 | 6.08 | 6.45 | 5.8 | 0.25 | 5 TPO |
| Group 3: UV, but Non-Gamma | | | | | |
| Sample 3 | 5.12 | 5.54 | 4.49 | 0.42 | 5 TPO |
| Sample 4 | 5.24 | 5.49 | 4.50 | 0.42 | 5 TPO |
| Sample 5 | 5.55 | 6.27 | 4.96 | 0.62 | 5 TPO |
| Sample 6 | 5.89 | 6.42 | 5.14 | 0.49 | 1 TB, 4 TPO |
| Group 4: UV and Gamma | | | | | |
| Sample 1 | 5.2 | 5.54 | 4.75 | 0.32 | 5 TPO |
| Sample 2 | 5.37 | 5.9 | 4.69 | 0.48 | 5 TPO |
| Sample 3 | 5.52 | 5.75 | 5.39 | 0.14 | 5 TPO |
| Sample 4 | 5.2 | 5.28 | 5.12 | 0.06 | 5 TPO |
| Sample 5 | 5.36 | 5.63 | 4.82 | 0.34 | 5 TPO |
| Sample 6 | 4.99 | 5.53 | 4.73 | 0.32 | 5 TPO |

Figure 2A:
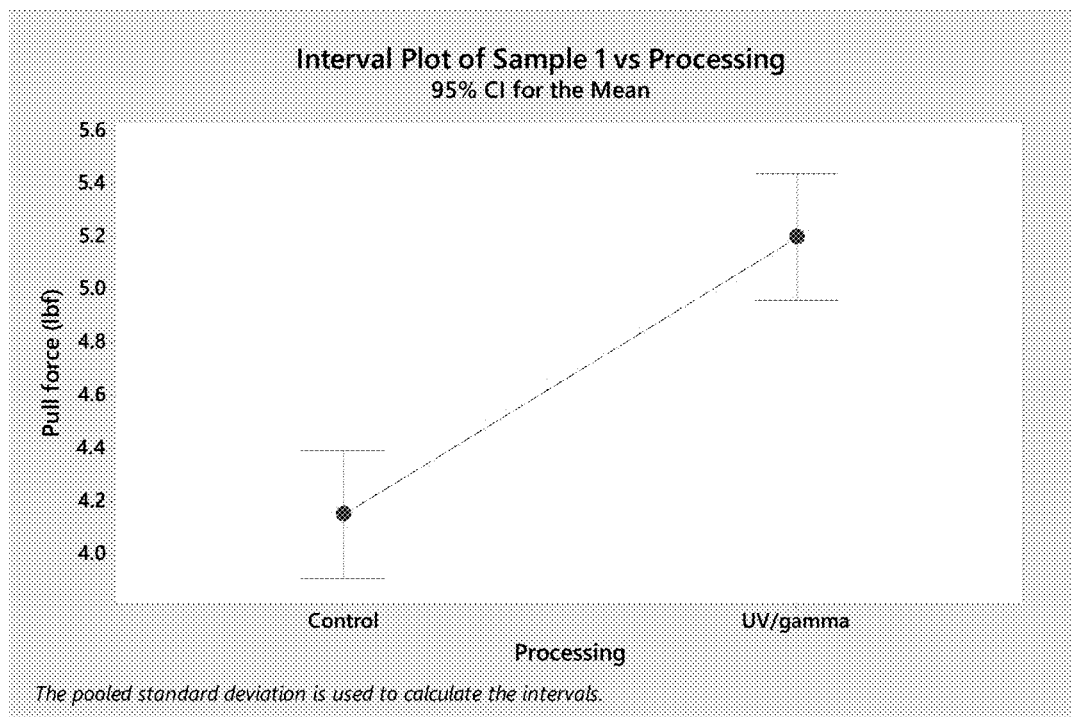
FIG. 2A and FIG. 2B are plots of pull force differences of sample adhesive formulations subjected to no radiation and UV/gamma radiation. The UV/gamma radiation processed group is statistically significant (p=0.000).
Figure 2B:
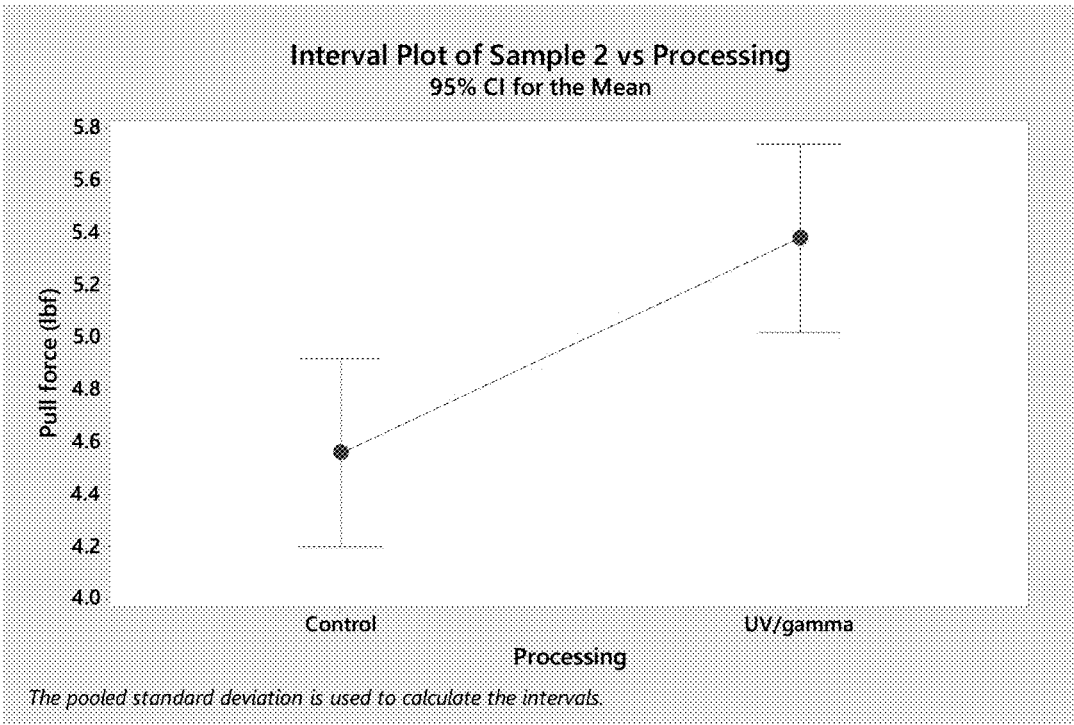

The adhesive composition in Sample 1 and 2 contains polybutadiene with reactive group of acrylate and solvent MEK. Although there is no UV or thermal initiator in the adhesive composition, after UV and gamma treatment, the pull force was observed to increase by 25% for Sample 1 and 18% for Sample 2 (FIG. 1). FIGS. 2A and 2B showed the Minitab results of a statistical improvement after UV/Gamma sterilization.

Figure 3:
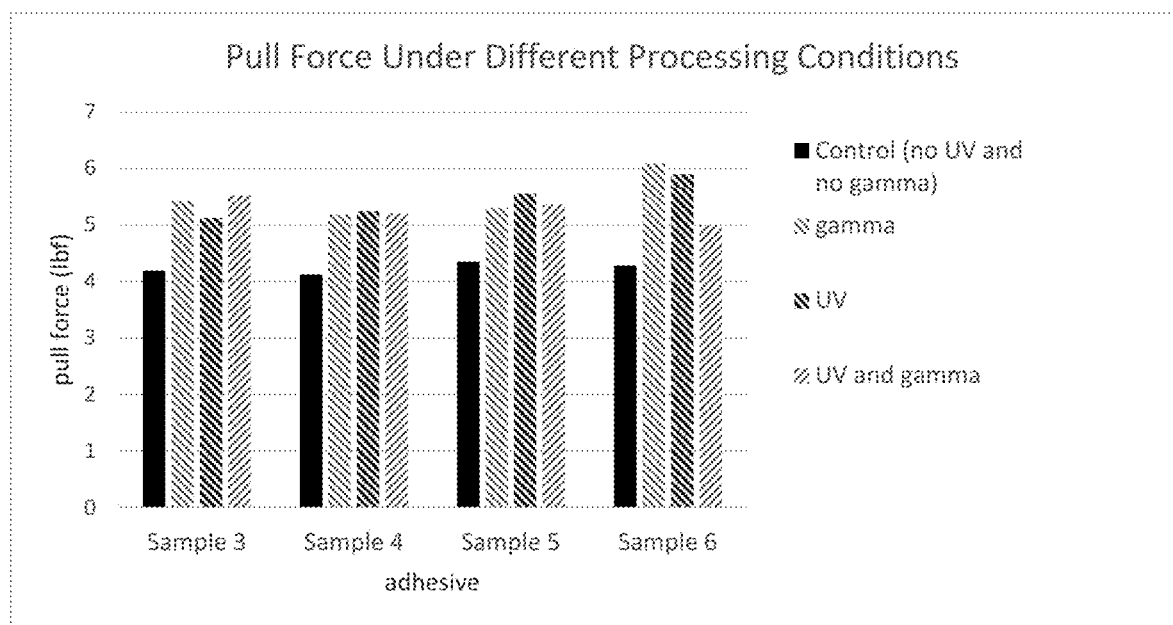
FIG. 3 is a plot of pull force differences of sample adhesive formulations subjected to various radiation conditions.

The pull force data in Table 2 from adhesive Sample 3, Sample 4, Sample 5 and Sample 6 was collected and plotted in FIG. 3 for comparison under different processing conditions with the increased pull force percentage from each of the processing conditions tabulated in Table 3.

TABLE 3

| | Pull force change by percentage (%) | | |
|---|---|---|---|
| | Gamma | UV | UV and gamma |
| Sample 3 | 29.4 | 22.2 | 31.7 |
| Sample 4 | 25.7 | 27.2 | 26.2 |
| Sample 5 | 21.8 | 27.6 | 23.2 |
| Sample 6 | 42.1 | 37.6 | 16.6 |

Further, to understand if the pull force change is statistically significant upon processing, an ANOVA analysis was performed with the graphic plots and Tukey's comparison test demonstrated below for Sample 3 to 6. The analysis showed that the processing (gamma, UV or the combination of UV and gamma) are needed to improve the pulling forces from control statistically significant for Sample 3 to 6.

In addition to the ingredients listed for the samples, other thermal and/or photoinitiators can be used. Viscosity modifiers can be used for manufacturability and ease of assembly. The adhesive formulations can be diluted with additional suitable organic solvents and can further include tackifiers. In addition, free radical inhibitor such as HQ, BHT, MEHQ might add to prolong the shelf-life of the thermal or photo-curable adhesive formulation.

It is understood that any specific order or hierarchy of blocks in the methods of processes disclosed is an illustration of example approaches. Based upon design or implementation preferences, it is understood that the specific order or hierarchy of blocks in the processes may be rearranged, or that all illustrated blocks be performed. In some implementations, any of the blocks may be performed simultaneously.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed is:

1. A method of bonding dissimilar materials of medical device components, the method comprising:
    applying an adhesive on a surface of one medical component comprised of a non-polar, non-polyvinyl chloride thermoplastic polymeric material or on a surface of another medical component comprised of a polyacrylate, polyacrylonitrile, polyester, and/or a polycarbonate or on both such surfaces;
    contacting the surfaces;
    exposing the contacted surfaces to heat or light radiation to crosslink the adhesive and to bond the surfaces; and
    subjecting the bonded surfaces to sterilization;

wherein the adhesive formulation consisting essentially of: (a) a polyolefin oligomer having reactive acrylate groups and alkenyl groups, (b) an initiator, and (c) a solvent, and wherein the polyolefin oligomer having reactive acrylate groups comprises a polybutadiene oligomer having reactive acrylate groups represented by Formula (I):

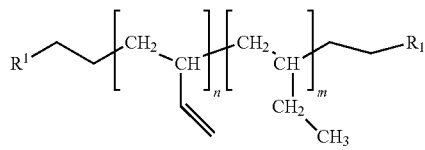

Formula I wherein $R_1$ represents an acrylate or methacrylate moiety linked to the polyolefin chain through urethane linkages, n is an integer from 10 to about 500, and m is an integer from 0 to about 250.

2. The method of claim 1, wherein the one medical component is medical tubing.

3. The method of claim 2, wherein the tubing comprises a styrene-containing thermoplastic elastomer.

4. The method of claim 1, further comprising subjecting the bonded surfaces to sterilization by ionizing radiation.

5. The method of claim 1, wherein the other medical component comprises a medical connector composed of an acrylic-based polymer, polyacrylonitrile, acrylonitrile-butadiene-styrene (ABS), methyl methacrylate-acrylonitrile-butadiene-styrene (mABS), acrylic-polycarbonate based material, polyesters, polycarbonate or a combination thereof.

6. The method of claim 1, wherein the one medical component comprises medical tubing composed of a styrene-containing thermoplastic elastomer and the other medical component is a medical connector composed of an acrylic-based polymer, polyacrylonitrile, acrylonitrile-butadiene-styrene (ABS), methyl methacrylate-acrylonitrile-butadiene-styrene (mABS), acrylic-polycarbonate based material, polyesters, polycarbonate or a combination thereof.

7. The method of claim 1, wherein the polyolefin oligomer having reactive acrylate groups comprises a polybutadiene oligomer having reactive acrylate groups linked to the polybutadiene oligomer via carbamate linkages and/or pendant 1,2 vinyl groups along the polybutadiene oligomer chain.

8. The method of claim 1, wherein the initiator comprises a photopolymerization initiator.

9. The method of claim 1, wherein the adhesive formulation includes a solvent.

10. The method of claim 1, wherein the adhesive formulation further comprises an acrylate monomer that reacts with the polyolefin oligomer.

11. The method of claim 1, wherein the polyolefin oligomer comprises at least 50% by weight of the reactive components of the adhesive formulation.

* * * * *